United States Patent [19]

Chmiel et al.

[11] Patent Number: 4,603,164

[45] Date of Patent: Jul. 29, 1986

[54] ADHESIVE FOR BONDING CURED EPDM RUBBER

[75] Inventors: Chester T. Chmiel, Granger, Ind.; Daniel J. Cotsakis, Carlisle, Pa.

[73] Assignee: Uniroyal Plastics Company, Inc., Middlebury, Conn.

[21] Appl. No.: 702,531

[22] Filed: Feb. 19, 1985

Related U.S. Application Data

[63] Continuation-in-part of Ser. No. 565,266, Dec. 27, 1983, Pat. No. 4,501,842.

[51] Int. Cl.$^4$ .......................... C08K 3/04; C08K 3/34; C08K 5/01; C08L 15/02
[52] U.S. Cl. ...................... 524/432; 524/450; 524/474; 524/507; 524/526; 525/125; 525/192; 525/194; 525/211; 525/232; 525/237
[58] Field of Search ............... 524/432, 450, 526, 527, 524/507, 474; 525/125, 194, 236, 235, 192, 211, 237, 232

[56] References Cited

U.S. PATENT DOCUMENTS

| 3,582,508 | 6/1971 | McIntosh | 525/125 |
| 3,635,861 | 1/1972 | Russell | 525/96 |
| 4,022,745 | 5/1977 | Schoen et al. | 525/125 |
| 4,096,204 | 6/1978 | Gergen et al. | 525/96 |
| 4,112,020 | 9/1978 | Callan | 575/96 |

FOREIGN PATENT DOCUMENTS 1272763 5/1972 United Kingdom ............... 525/125

*Primary Examiner*—Allan M. Lieberman
*Attorney, Agent, or Firm*—John A. Shedden

[57] ABSTRACT

An adhesive for bonding cured EPDM membranes is provided comprising
(A) a halogenated butyl rubber
(B) a pre-crosslinked butyl rubber
(C) methylene-propylene-nonconjugated diene terpolymer
(D) a thermoplastic petroleum based hydrocarbon feedstock derived aliphatic monomer resin and
(E) an aliphatic isocyanate.

3 Claims, No Drawings

ADHESIVE FOR BONDING CURED EPDM RUBBER

This is a continuation-in-part of application Ser. No. 565,266 filed Dec. 27, 1983, now U.S. Pat. No. 4,501,842.

This invention relates to an improved solvent based contact adhesive which is useful for providing a strong bond between sheets of cured ethylene-propylene-diene terpolymers (EPDM).

EPDM rubber is widely used in the tire industry. However, the bonding techniques used in tires requires special surface preparation and high pressure and heat conditioning. When EPDM membranes are used as material other than for tires, such as for a roofing material, it is sometimes necessary to prepare a lap seam bonding the EPDM membranes to itself.

In the prior art, such as Skeist, I., *Handbook of Adhesives*, pp. 880, New York, Reinhold Publishing Corp., 1977, it is suggested that a neoprene-based adhesive may be used for bonding EPDM rubber. Currently, the commonly used adhesive is one based on neoprene dissolved in a mixture of solvents and incorporating resins, fillers, curatives and stabilizers to a total solids content of about 23%. This compound develops a T-peel adhesion of approximately 2 lbs./inch width.

Adhesives based on neoprene generally have excellent resistance to creep and cold flow, but have the drawback of providing only low levels of bond strength to cured EPDM.

Known contact adhesives based on butyl or polyisobutylene polymers while developing good ultimate bond strengths to cured EPDM, have unsatisfactory creep, cold flow and heat strength characteristics. In addition, it is known that mixtures of neoprenes and butyls and/or polyisobutylenes do not overcome the short-comings of either component as set forth above.

EPDM itself is a poor adhesive polymer. When EPDM is used as an adhesive the resulting compounds have little or no tack and when uncured are very thermoplastic.

It is therefore an object of the invention to provide an adhesive that will develop a good ultimate bond strength to the joining of cured EPDM membranes as well as maintaining satisfactory creep, cold flow and heat strength characteristics, all without the addition of special surface preparations or the use of high pressure and/or heat.

In accordance with the invention, an adhesive formulation is provided comprising a blend of three rubbers, namely, (1) a halogenated butyl rubber, (2) a pre-crosslinked butyl rubber and (3) a three block copolymer with polystyrene end blocks and a rubbery poly (ethylene-butylene) mid block, together with a petroleum hydrocarbon based aliphatic thermoplastic resin having a high softening point and an aliphatic isocyanate.

The invention also provides an improved method for preparing said adhesive which method comprises the separate milling or mixing in a Banbury TM mixer of said halogenated and pre-crosslinked butyl rubbers and sequential additions when solubilizing the ingredients with the butyl rubbers first and the isocyanate modifier last into a cool churn which has been purged of moisture.

The halogenated butyl rubber ingredient is preferably Bromobutyl of 27–51 Mooney viscosity (ML 1+8 at 125° C.) and 2.0–2.5% bromine content. The halogenated butyl rubber may be added at a concentration of 20.0–45.0 parts per hundred parts of rubber. Chlorobutyl rubber may be used in place of bromobutyl rubber. The Mooney viscosity of said chlorobutyl rubber is in the range 27–51 (ML 1+8 at 125° C.) and possesses a 1.1–1.3% chlorine content. Adhesives incorporating chlorobutyl rubber impart bond strengths between cured EPDM sheets higher than those given with neoprene adhesives currently used but lower than those given by the preferred bromobutyl rubber adhesives of this invention.

The molecular structure of regular butyl rubber may be schematically shown as represented by Skeist, I., *Handbook of Adhesives*, pp. 255, New York, Reinhold Publishing Corp., 1977, as follows:

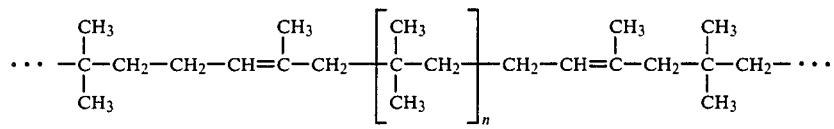

Where n is about 50.

Halogenation of the above polymer is derived through a proprietary process with up to 90% of the halogenation situated allylic to the double bond with retention of most of the unsaturation. This is schematically represented as follows:

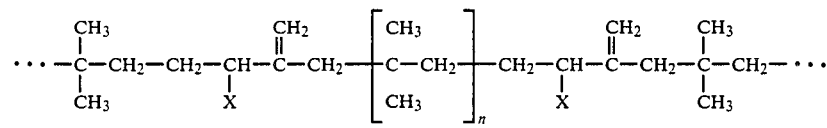

Where X is Cl or Br and n is about 50.

These halogenated butyl rubbers may be of the bromobutyl or chlorobutyl type made by Polysar Ltd., Sarnia, Ontario, Canada or by Exxon Chemical Company, Houston, Tex.

The pre-crosslinked butyl rubber is also derived from regular butyl rubber through a proprietary process by incorporating a crosslinking agent during the polymerization of the rubber. The finished product may be schematically represented as follows:

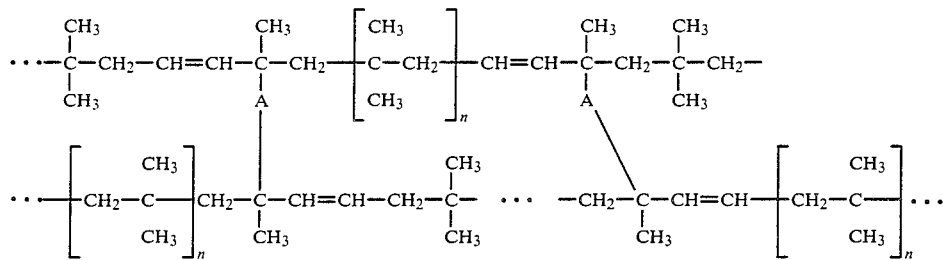

Where n is about 50 and A is a crosslinking agent such as 1,4 divinyl benzene, methyl divinyl benzene, 1,3 butadiene, isoprene, 2-ethyl 1,3-butadiene, 1,6-hexadiene, 1,6-hexanediol-diacrylate, 2 methyl-1,3-butadiene, butyleneglycol dimethylacrylate, 1,4 butanediol diacrylate, thiodiglycol dimethacrylate, diallyl maleate, decamethylene glycol diacrylate, 2-chloro 1,3 butadiene, polyethylene glycol dimethyacrylate, 1 phenyl ethylene-1,2-dimethacrylate.

Not all of the unsaturation is reacted so that part of the butyl rubber is still soluble.

Such pre-crosslinked butyl rubber may be of the type made by Polysar Ltd., Sarnia, Ontario, Canada and may be of a weight percent solubility in cyclohexane of 15-50 percent and a concentration 40.0-65.0 parts per hundred parts of rubber.

The styrene-(ethylene-butylene)-styrene block thermoplastic rubber ingredient may be of the type produced by Shell Chemical Company, Houston, Tex. with a styrene content of 28-29% by weight, a midblock content of 71-72% by weight and tensile strength of 4500-5000 lbs./in$^2$ and said block copolymer used at a concentration of 15.0-20.0 parts per hundred of rubber.

A block copolymer also applicable in this invention is one where the butylene in the midblock is replaced by propylene to give a styrene-(ethylene propylene)-styrene block copolymer.

The general formula for these block copolymers is:

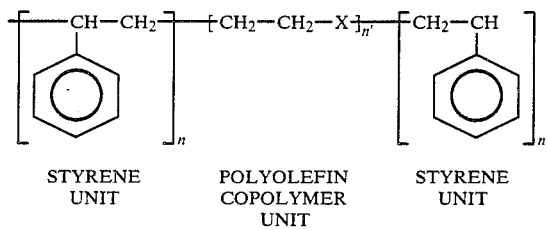

| STYRENE UNIT | POLYOLEFIN COPOLYMER UNIT | STYRENE UNIT | where X=propylene unit:

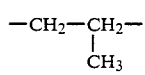

or butylene unit:

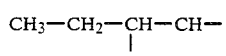

and n is from 20 to 1200 and n' is from 70 to 700.

Refer to U.S. Pat. No. 3,917,607 assigned to Ronald K. Crossland and James T. Harlan. Alternately and preferably the styrene/ethylene-butylene/styrene block copolymer may be omitted and ethylene-propylene-non-conjugated diene terpolymer used instead at levels of from 0 to 20 parts, usually 5-15 parts per hundred parts by weight of total rubber. The absence of such block polymer makes it advisable to modify the concentration of the other ingredients in the adhesive compositions of this invention, i.e. the halogenated butyl rubber ought to be present at 35-65, preferably 40-60 phr, the pre-crosslinked butyl rubber is added at a 35-65, preferably 35-50 phr level, the thermoplastic, petroleum hydrocarbon feed stock derived aliphatic monomer derived from $C_5$-$C_9$ streams polymerized to certain molecular weights to give a softening range of 162°-181° C. may be added to a 80-120, preferably 90-110 phr concentration, and the aliphatic polyisocyanate may be used at 10-40, preferably 10-30 phr level, it being understood that phr stands for parts per 100 parts of rubbery components present in the composition, all by weight.

These modified adhesive compositions allow the practitioner more time (ca. 2 hours) for laying up the EPDM's to be adhered together rather than the 10-20 minutes usually available for that purpose.

The low molecular weight, high softening point, thermoplastic aliphatic type hydrocarbon based resin is made from petroleum monomers. The aliphatic resin is introduced to impart improved compatibility between the block copolymer and butyl rubbers, and to improve the high temperature heat strength of the butyl rubbers. The aliphatic resin is derived from hydrocarbon feedstock monomers possessing 5-9 carbon atoms polymerized to varying molecular weight ranges so as to give softening points of 162° C. to 181° C. The preferred resin is one possessing a higher softening point range from 175° C.-181° C. The higher softening resin when incorporated into the formulations of this invention impart higher strengths to butyl and block copolymers mixtures at the test temperatures of about 70° C. An example of high softening point resins applicable in the invention is the Piccovar TM series produced by Hercules, Inc. Wilmington, Del. with a softening point of 175°-181° C., an acid number of less than 1 and a bromine number of 16.0-20.0 at a concentration of 120.0-160.0 parts per 100 rubber.

The organic isocyanate ingredient of the invention functions to provide a cure of the halogenated butyl rubber when exposed to moisture. Useful organic isocyanates include 1,6 hexamethylene diisocyanate; 2,4 and 2,6-toluene diisocyanate; 4,4-diphenylmethane diisocyanate; polymethylene polyphenylisocyanate; 4,4-dicyclohexylmethane diisocyanate; xylylene diisocyanate; but, most of these tend to give either short gel times or reduced high temperature heat strength. A preferred type is Desmodur TM N-75 isocyanate available in a 75% solution from Mobay Chemical Corporation, Pittsburgh, Pa. This material has an NCO content of 15.0-17.0% and is an aliphatic compound which is an adduct based on 1,6 hexamethylene diisocyanate:

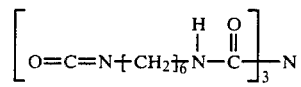

Said isocyanate is used at concentrations in the range of 20.0-35.0 parts per 100 rubber.

To scavenge moisture inadvertently incorporated into the adhesive during manufacture and packaging, an adsorbent of the alkali-metal alumino-silicate zeolite family of compounds is added. Typical Molecular Sieves are 5A or 13× supplied by the Linde division of Union Carbide, New York, N.Y. Said Molecular Sieves are used at a concentration of 5.0-15.0 parts per 100 parts of rubber.

Optionally, where high temperature performance is required, zinc oxide may be added at a concentration of 0.5-2.0 parts per 100 parts of rubber. A typical zinc oxide is Protox 166 produced by New Jersey Zinc Co.

The zinc oxide is added to allow some modulus increase of the halogenated butyl rubber, but little enough so that the solution stability is not adversely affected.

The aforementioned ingredients are dispersed in an organic liquid having a solubility parameter of 8.5-8.9 and a hydrogen bonding index 3.0-3.5. Said solvent is used at a concentration of 500.0-640.0 parts per 100 parts rubber giving a total solids level of 31.0-37.0 percent. To improve ease of application and drying of the adhesive, the dispersing medium may be a blend of 2 or more solvents.

Carbon black may also be added for pigmenting purposes and/or to improve mill or Banbury TM processing of the butyl polymers. The carbon black may be of medium reinforcement character, having an ASTM number from N-285 thru N-330. Said carbon black is used at a concentration of 2.0-20.0 parts per 100 parts rubber.

In order to maximize solution stability, the ingredients are processed and mixed in a controlled sequence. The halogenated butyl and pre-crosslinked butyl are separately milled or mixed in Banbury TM mixer to homogenize them and work some of the nerve out. It has been found that carbon black improves the processing of the mill or the Banbury TM mixed batches. Solubilization of the adhesive is initiated by dispersing the mill/Banbury batches in 75% of the solvent. It is important that the heat build up be kept at a minimum throughout the solubility procedure. This is followed, after a period of 2-3 hours, by the addition of the thermoplastic resin, thermoplastic rubber and molecular sieves to begin scavenging moisture. At this point, the mixing vessel should be sealed and purged with nitrogen. After another 2-3 hours, the zinc oxide should be added with the remaining solvent. The mixing vessel is then resealed and purged followed by mixing for 1 hour minimum or until smooth. This is followed by cooling of the churn to no more than 80° F. Any evaporated solvent is then replaced, along with blending in of the isocyanate.

The above procedure results in a compound with a storage stability of greater than six months. It has been found that a substantive deviation from the above procedure may result in a drop in stability to much less than six months.

The following examples, while not intending to be limiting of the invention, illustrate the invention in greater detail.

EXAMPLE 1

This example illustrates the adhesion level generated by the industry standard neoprene-based adhesive such as N-100 distributed by Carlisle Corp.

Test samples were prepared by vigorously washing the surface of a particular 0.065" thick cured EPDM membrane with a cloth soaked with heptane. 1"×6" strips were then cut. A thin coat of the N-100 adhesive was then brushed onto the strips and allowed to dry 15 min. T-peel adhesion samples were prepared by bringing the whole adhesive coating side of one strip together with the adhesive coated side of another strip, followed by lamination with a hand roller. Lap shear adhesion samples were prepared by bringing strips together so a 1"×1" contact area was formed, followed by lamination with a hand roller. Adhesion samples were then allowed to stand undisturbed for 7 days at 25° C. This was followed by adhesion testing on an Instron TM tensile tester with the jaw speed set for 2 in./min. and testing being performed at 25° C. and 70° C. The following results were obtained:

TABLE 1

| Test @ 2 in./min. | 25° C. Results | 70° C. Results |
|---|---|---|
| T-Peel Adhesion (lbs./in. width) | 2.2 | 1/5 |
| Lap Shear Adhesion (lbs./in.$^2$) | 14.8 | 12.0 |

All test samples showed adhesive failure at the adhesive/membrane interface.

EXAMPLE 2

This example illustrates the adhesion level generated by the adhesive and manufacturing procedure of the instant invention.

The following formulation was used to prepare the adhesive invention:

| Ingredient | Parts By Weight |
|---|---|
| Mill Batch A | |
| Polysar Bromobutyl X-2 | 45.0 |
| Cabot Regal 300 Carbon Black | 2.0 |
| | 47.0 |
| Mill Batch B | |
| Polysar Butyl XL-20 | 40.0 |
| | 40.0 |
| Churn Batch | |
| Mill Batch A | 47.0 |
| Mill Batch B | 40.0 |
| Shell Kraton G1652 | 15.0 |
| Hercules Piccovar AB180 | 150.0 |
| Protox 166 ZnO | 2.0 |
| Molecular Sieves #5A | 10.0 |
| Toluene | 400.0 |
| Hexane | 100.0 |
| Desmodur N-75 (75% solids solution) | 25.0 |
| | 789.0 |
| Total Solids: | 35.8% |

The Bromobutyl with carbon black and pre-crosslinked butyl were mixed separately on a two roll mill for 20 minutes minimum. Above mill batches could also be processed in a Banbury TM for a minimum of 6 minutes. These mill batches were then cut-up and added to an adhesive churn loaded with 75% or 375 PPHR of the above solvents, hexane and toluene. This was allowed to mix 2 hours minimum. This was followed by the addition of the Piccovar AB180, the Kraton G1652, the Molecular Sieves #5A. At this point, the churn was sealed and purged with dry nitrogen. This was allowed to mix an additional 2 hours minimum, followed by the addition of the zinc oxide and the remaining 25% or 125 PPHR of solvent. The churn was again sealed, dry nitrogen purged and allowed to mix 1 hour minimum or until smooth. The churn was then cooled down to 80° F. maximum, followed by volume adjustment to compensate for evaporated solvent and Desmodur N-75 isocyanate. Adhesion test samples were then prepared, treated and tested in the same fashion described in Example 1. Test results were as follows:

TABLE 2

| Test @ 2 in./min. | 25° C. Results | 70° C. Results |
|---|---|---|
| T-Peel Adhesion (lbs./in. width) | 6.4 | 2.4 |
| Lap Shear Adhesion (lbs./in.$^2$) | 35.7 | 18.8 |

All 25° C. tested samples showed a mixture of adhesive and cohesive failure within the adhesive; 70° C. tested samples showed all cohesive failure.

EXAMPLE 3

This example illustrates the resulting loss of adhesion when the high softening point thermoplastic resin level falls below 120 PPHR. Resin concentration in this instance was 100 PPHR. T-peel adhesion samples only were prepared and aged in the same fashion discussed in Example 1. Test results were as follows:

TABLE 3

| Test Temperature | T-Peel Adhesion @ 2 in./min. (lbs./in. width) |
|---|---|
| 25° C. | 4.5 |
| 70° C. | 0.7 |

25° C. tested samples showed mixed adhesive and cohesive failure within the adhesive, 70° C. tested samples showed all cohesive failure.

EXAMPLE 4

This example illustrates the resulting loss in adhesion when the isocyanate is eliminated from the compound. T-peel adhesion samples only were prepared and aged in the same fashion discussed in Example 1. Test results were as follows:

TABLE 4

| Test Temperature | T-Peel Adhesion @ 2 in./min. (lbs./in. width) |
|---|---|
| 25° C. | 4.0 |
| 70° C. | 0.9 |

All test samples showed cohesive failure within the adhesive.

EXAMPLE 5

This example illustrates the resulting loss in adhesion when the zinc oxide is eliminated from the compound. T-peel adhesion samples only were prepared and aged in the same fashion discussed in Example 1. Test results were as follows:

TABLE 5

| Test Temperature | T-Peel Adhesion @ 2 in./min. (lbs./in. width) |
|---|---|
| 25° C. | 6.3 |
| 70° C. | 1.2 |

25° C. tested samples showed mixed adhesive and cohesive failure within the adhesive; 70° C. tested samples showed all cohesive failure.

EXAMPLE 6

This example illustrates the resulting loss in stability when manufacturing procedure is varied from that procedure stated herein. 2.0 PPRH of zinc oxide was added to the Bromobutyl Banbury stock instead of to the mixing churn. The resulting adhesive was extremely rough and snotty in appearance and gelled in only 2.5 weeks.

EXAMPLE 7

This example illustrates the resulting loss in stability when mixing vessel temperature at the point of isocyanate addition is significantly above 80° F. The mixing sequence followed was that described in example 2, except, the solution temperature at the point of isocyanate addition was not reduced to lower than 140° F. The resulting adhesive looked very good initially, but gelled in only 2 weeks.

EXAMPLE 8

Following essentially the procedure of Example 2, an adhesive composition was prepared and evaluated using the recipe below:

| Ingredient | Parts per Weight |
|---|---|
| Mill Batch A | |
| Polysar Bromobutyl X-2 | 48 |
| Mill Batch B | |
| Polysar Butyl XL-50/1 | 42 |
| Royalene [trademark] 539[1] | 10 |
| Carbon Black | 2 |
| Churn Batch | |
| Mill Batch A | 48 |
| Mill Batch B | 54 |
| Hercules Piccovar A-B 180 | 100 |
| ZnO | 2 |
| Antioxidant[2] | 2 |
| Molecular Sieves #5A | 10 |
| Toluene | 387 |
| Xylene | 43 |
| Hexane | 107 |
| Desmodur N-75 | 20 |
| Total | 773 |
| Solids, % | 29.9 |

The test results were as follows:

| Test @ 2"/min. | at 25° C. | at 70° C. |
|---|---|---|
| T-Peel adhesion (lbs./in. width) | 8.0 | 1.4 |
| Lap sheer adhesion, psi | 42.3 | 14.2 |

Remarks:
(1) EPDM; ML-4 at 125° C. = 70
(2) Irganol [trademark] 1010

The data indicate the good adhesion obtained for cured EPDM using the composition of this invention.

In the absence of polyisocyanate, the T-Peel adhesion values at 25° C. and 70° C. were only 6.5 and 0.4 lbs./in. width, respectively.

What is claimed is:

1. An adhesive composition comprising:

35–65 parts halogenated butyl rubber having a bromine content of 2.0–2.5% or a chlorine content of 1.1–1.3%; 35–65 parts pre-crosslinked butyl rubber having a weight percent of solubility in cyclohexane of 15–50%;

5–20 parts ethylene-propylene-non-conjugated diene terpolymer; 80–120 parts thermoplastic, aliphatic monomer derived hydrocarbon resin derived from $C_5$–$C_9$ streams polymerized to certain molecular weights to give a softening range of 162°–181° C., an acid number of less than 1 and a bromine number of 16.0–20.0; and 10–40 parts aliphatic polyisocyanate wherein said polyisocyanate is based on 1,6 hexamethylene diisocyanate adduct with an NCO content of 15.0–17.0% concentration;

all in parts per 100 parts by weight of rubbery components.

2. The adhesive composition of claim 1 wherein the said halogenated butyl rubber is 40–60 parts, said pre-crosslinked butyl rubber is 35–50 parts, ethylenepropylene-non-conjugated diene terpolymer is 5–15 parts, the thermoplastic hydrocarbon resin is 90–110 parts, and the aliphatic polyisocyanate is 10–30 parts per 100 parts of rubbery polymers.

3. An adhesive composition of claim 1, further comprising an adsorbent of the alkali-metal aluminosilica zeolite family of compounds at a concentration of 5.0–15.0 PPHR; zinc oxide at a concentration of 0.5–2.0 PPHR; an organic liquid having a solubility parameter of 8.5–8.9 and a hydrogen bonding index of 3.0–3.5 at a total concentration of 500.0–640.0 PPHR resulting in a total solid level of 31.0–37.0% and carbon black concentration of 2.0–20.0 PPHR.

* * * * *